United States Patent

[11] 3,607,775

| [72] | Inventors | Noble Hajime Yoshida<br>Kettering;<br>Robert Erwin Miller, Dayton, both of Ohio |
|---|---|---|
| [21] | Appl. No. | 701,125 |
| [22] | Filed | Jan. 29, 1968 |
| [45] | Patented | Sept. 21, 1971 |
| [73] | Assignee | The National Cash Register Company<br>Dayton, Ohio |

[54] PROCESS FOR ENCAPSULATING MINUTE PARTICLES BY USE OF AUTOGENOUSLY POLYMERIZABLE CAPSULE WALL MATERIAL
9 Claims, No Drawings

[52] U.S. Cl. .................................................. 252/316,
71/64 F, 99/118 P, 99/140 R, 99/166, 106/308 N,
117/62.2, 117/100 A, 117/100 B, 252/182,
252/522, 264/4, 424/32, 424/33, 424/34, 424/35,
424/36, 424/37
[51] Int. Cl. .................................................. B01j 13/02,
B44d 1/02, B44d 1/44
[50] Field of Search .......................................... 252/316;
424/32, 34, 37; 117/62.2, 100 A; 264/4

[56] References Cited
UNITED STATES PATENTS

| 2,969,331 | 1/1961 | Brynko et al. ................. | 252/316 |
| 3,137,631 | 6/1964 | Soloway ......................... | 252/316 X |
| 3,151,027 | 9/1964 | Cooley et al. .................. | 424/32 X |

*Primary Examiner*—Richard D. Lovering
*Attorneys*—E. Frank McKinney and Robert J. Shafer ABSTRACT: A method is provided for producing, en masse, in a liquid manufacturing vehicle, minute capsules having walls which comprise a complex of at least two polymeric materials originally having opposite net electrical charges, at least one of which polymeric materials additionally is autogenously polymerizable to a solid polymeric material insoluble in the manufacturing vehicle. In the process, a liquid-liquid phase separation is effected by complex coacervation that is brought about by the opposite charges on the charged polymeric materials while in solution, and the complexly combined materials thereby emerge from solution in the manufacturing vehicle as a liquid phase relatively rich in the polymeric materials. The emergent liquid phase wets and enwraps particles of intended capsule core entities which have been dispersed in the manufacturing vehicle to form liquid-walled capsules and then conditions in the manufacturing vehicle are altered to cause the autogenously polymerizable material to react and produce solid, water-insoluble, capsule walls.

PROCESS FOR ENCAPSULATING MINUTE PARTICLES BY USE OF AUTOGENOUSLY POLYMERIZABLE CAPSULE WALL MATERIAL

BACKGROUND OF THE INVENTION

1. Field of the Invention

This invention pertains to a process for producing minute capsules, en masse, in a liquid manufacturing vehicle, wherein the capsule walls comprise an intimate, homogeneous, combination of at least two polymeric materials at least one of which has been autogenously polymerized after initial formation of the capsule walls. It more specifically relates to such a process wherein the polymeric materials, in aqueous solution, have opposite net electrical charges and wherein the capsule wall formation is a result of liquid-liquid phase separation by complex coacervation coupled with a continuing action of hardening, by polymerization, after the capsule walls first form.

An important aspect of this invention resides in the discovery that water-soluble autogenously polymerizable, polymeric materials which have a net electrical charge in an aqueous medium, can be utilized with other, oppositely charged, hydrophilic polymeric materials to yield liquid-liquid phase separation by complex coacervation. Equally important, is the discovery that the separated liquid phase can be used to wet and enwrap particles of intended capsule core entities to produce liquid-walled capsules and, further, that the liquid walls can be hardened, solidified, and rendered water insoluble by causing the autogenously polymerizable polymeric material to be further polymerized.

DESCRIPTION OF THE PRIOR ART

Encapsulation by means of liquid-liquid phase separation is well known—it being taught, among many other places, in U.S. Pat. Nos. 2,800,457 and 2,800,458, issued July 23, 1957 on the applications of Barrett Green and Lowell Schleicher and of Barrett Green, respectively, and assigned to the assignee herein. U.S. Pat. No. 2,800,458, (now Re. 24,899 which issued Nov. 29, 1960 ) teaches encapsulation by what is termed simple coacervation wherein a hydrophilic polymeric material is caused to emerge from solution, in an aqueous manufacturing vehicle, as a liquid, relatively high in concentration of the polymeric material. The emergent liquid phase is utilized to form capsule walls about particles dispersed in the manufacturing vehicle. In this simple coacervation, the polymeric material is caused to emerge from solution as a separate phase due to alteration of the manufacturing vehicle by addition of a phase-separation-inducing material to make the polymeric material partially immiscible in said vehicle.

U. S. Pat. No. 2,800,457 teaches encapsulation by what is termed complex coacervation wherein at least two hydrophilic polymeric materials having opposite net electrical charges are caused to combine or complex in an aqueous liquid manufacturing vehicle to yield an emergent liquid phase having a relatively high concentration of the complexed combination of polymeric materials. The emergent liquid phase is utilized to form capsule walls about particles dispersed in the manufacturing vehicle. In this complex coacervation, formation of the complex of polymeric materials causes liquid-liquid phase separation because the complex is only partially miscible with the manufacturing vehicle. Furthermore, it is taught in the U. S. Pat. No. 2,800,457 that the complexed capsule wall material can be chemically hardened by reaction with introduced formaldehyde, that is, another material—formaldehyde—can be introduced and caused to react with the capsule wall material to produce capsule walls which are harder and more dense than the capsule walls before reaction with formaldehyde.

U. S. Pat. No. 3,137,631 issued June 16, 1964 on the application of Saul Soloway teaches manufacture of capsules which contain water-insoluble materials wherein an initial capsule wall is formed from heat-denatured albumin and an additional, hardened, capsule wall of polymeric material is provided by a polymerization reaction between urea and formaldehyde. In the above-mentioned Soloway patent, there is no complex coacervation, and the capsule wall hardening is not accomplished by autopolymerization of a polymeric material.

Although not prior art, U. S. Pat. application Ser. No. 701,124 filed Jan. 29, 1968, on the same day as this patent application in the names of Robert Bayless and Donald Emrick and assigned to the assignee herein teaches a method for treating water-swollen polymeric capsule wall material by complexing the swollen capsule wall material with a first reactive polycondensation reaction component material and then adding a second reactive component material to the manufacturing vehicle to cause a polycondensation reaction and yield a new water-insoluble polymeric material localized in substantial homogeneity within the water-swollen capsule wall material throughout the capsule walls. The above-mentioned patent application Ser. No. 701,124 teaches a method for treating capsule walls, by addition to the capsule wall material, of a different species of polymerizable monomeric units necessary to generate polymeric material insitu within the capsule walls.

SUMMARY OF THE INVENTION

In the process step of drying capsule walls comprising hydrophilic polymeric material wherein the capsule walls have been produced in an aqueous liquid manufacturing vehicle, capsule-wall-to-capsule-wall adhesion is often a problem. Capsules which are isolated from the aqueous manufacturing vehicle prior to a drying step have wet, water-swollen, capsule walls which become very tacky when the water content in the walls reaches a certain critical value. The wet-walled capsules have exhibited a tendency to stick together or agglomerate with other capsules during previously known capsule-wall-drying processes which gradually removed water from the walls. Several processes have been developed as aids in mitigation of the capsule-wall-to-capsule-wall adhesion. A few of such processes include: treating water-swollen capsule walls with surface-active materials; immersing swollen-walled capsules in a hygroscopic liquid; extracting water from the wet capsule walls by the action of water-miscible solvents; and mixture of the undried capsules with a finely divided inert filler material. All of those above-mentioned processes require additional steps and raw materials and, moreover, are not always found to produce an adequate capsule product, and this invention provides a process where these extraneous materials and steps are not needed.

A process has now been found in which careful selection of certain materials and conditions used in capsule manufacture provide for automatic polymerization of the capsule walls and consequent capsule isolation and capsule wall drying with no special process steps being required. Separation of the capsule product into free-flowing, substantially unagglomerated entities automatically ensues on drying. The nonagglomerating characteristics of capsule walls produced by the process of this invention are obtained by use, in the capsule wall, of the specified autogenously polymerizable polymeric material which is capable of further polymerization. In practice of this invention, said further polymerization can be caused to terminate or to continue until the resulting, new, polymeric material is substantially water insoluble or hydrophobic, at which time the capsules can be separated from the manufacturing vehicle. Water included physically in the capsule walls can be evaporated to yield a finished capsule product which is dry and free flowing and consists of substantially unagglomerated capsule entities.

Autogenously polymerizable polymeric materials generally eligible for use in practice of this invention include substantially water-soluble polymeric materials having a positive or negative net electrical charge. Such generally eligible materials are selected primarily according to three criteria: (1) the material must have substantial water solubility in order to be useful in forming a solution for the encapsulating process; (2) the material must be electrically charged in order to be capable of undergoing complex coacervation with another, oppositely charged, polymeric material; and (3) the material must be autogenously polymerizable subsequent to deposit as a capsule wall, in order to provide water-insoluble capsule walls without additional capsule-processing steps or materials being employed. Autogenously polymerizable polymeric materials preferred for use in the present invention include amine-aldehyde resins having either positive or negative net electrical charge. Such amine-aldehyde resins include: sulfomethylated urea-formaldehyde wherein sulfite chemical groups are attached to a urea-formaldehyde polymeric material to yield an anionic resin: amine-modified urea-formaldehyde material wherein amine chemical groups such as ethylenediamine, diethylenetriamine, triethylene-tetramine, guanidine, biguanidines, guanylureas, ethanolamine or diethanol-amine are chemically attached to a urea-formaldehyde polymeric material to yield a cationic resin; and melamine-formaldehyde salts wherein melamine-formaldehyde polymeric material is reacted with an acid, such as hydrochloric acid, to yield a cationic resin. Other autogenously polymerizable polymeric materials generally eligible for use in practice of this invention include: polyamide-polyamine-epichlorohydrin resins wherein polyamide materials derived from aliphatic carboxylic acids such as adipic acid, succinic acid, and the like or polyalkylene polyamines such as diethylenetriamine, tetraethylenepentamine, and the like are reacted with epichlorohydrin to yield a cationic resin; cationic amino-polyacrylamide resins; acrylamide-acid copolymers wherein the acids are acrylic acid, methacrylic acid, and the like; and acrylic copolymers wherein ammonium salts are produced of copolymers of acrylic acid, methacrylic acid, itaconic acid, and the like and acrylonitrile or the esters of acrylic acid, methacrylic acid, or the like.

It is an object of this invention to provide a process for making minute capsules, en masse, in an aqueous manufacturing vehicle, wherein capsule wall material emerges from solution in the manufacturing vehicle by means of complex coacervation and wherein the capsule wall material comprises at least one autogenously polymerizable polymeric material.

Another object of this invention is to provide a process for rendering the wall material of said capsules solid and substantially water-insoluble by adjustment of manufacturing liquid conditions to induce further polymerization of the autogenously polymerizable polymeric material contained in the capsule walls.

Another, further object of the present invention is to provide a capsule product which can be from FROM its liquid manufacturing vehicle and dried without appreciable agglomeration of individual capsules during the drying process.

One embodiment of the process of this invention includes establishment of an agitating two-phase, liquid, system comprising an aqueous solution of at least two electrically charged, hydrophilic, polymeric materials at least one of which has net positive electrical charge and at least one other of which has net negative electrical charge. One or both of the electrically charged, hydrophilic, polymeric materials is selected to be an autogenously polymerizable resin material. The system, once established, includes a liquid phase which contains a major portion of the polymeric materials of the system in complexed form dispersed in a continuous liquid phase which contains a minor portion of the polymeric materials in equilibrium with the dispersed phase. Particles of an essentially water-insoluble material, to serve as intended capsule core entities, are dispersed in the established system and are wetted and enwrapped by the dispersed phase of complexed polymeric materials to form liquid-walled capsules. Conditions in the system are then altered and the autogenously polymerizable resin material portion is caused to further polymerize and render the liquid-capsule walls hard and water insoluble. The so-formed capsules are then separated from the liquid system and water remaining in the capsule walls is removed by any convenient means. The capsule product of this process consists of substantially unagglomerated capsule entities which are essentially spherical and have diameters of about 5 to 5,000 microns, or perhaps slightly larger as determined by the degree of agitation. The capsules, in a mass, appear granular and dry in that they are free flowing and have dry, rigid, exterior surfaces even when filled with a liquid material such as a volatile solvent or a sticky resin.

The autogenously polymerizable resin materials which constitute at least one component of the capsule walls can be caused to polymerize further by simple alteration of conditions in the capsule manufacturing vehicle. Examples of such alterations include: increasing the temperature of the vehicle; changing the pH of the manufacturing vehicle by adding hydrogen ions to catalyze the reaction; and adding monomeric constituents of the polymeric resin material, e.g., melamine, urea, formaldehyde etc.

With the foregoing discussion and objects of the invention in mind, the invention will now be explained in detail, from which detailed explanation and the appended claims, further objects and features of the invention will become apparent to those skilled in the art to which this invention pertains. Material contained by capsule walls of this invention, i.e., the capsular internal phase or core material, is relatively unimportant to the practice of the invention and can be any material which is substantially water insoluble and which does not interact with the intended capsule wall material, or other encapsulating components, to the detriment of the novel process. A few of the materials which can be utilized as capsule internal phases include, among a multitude of others: water-insoluble or substantially water-insoluble liquids such as olive oil, fish oils, vegetable oils, sperm oil, mineral oil, xylene, toluene, kerosene, chlorinated biphenyl, and methyl salicylate; water-insoluble metallic oxides and salts; fibrous materials such as cellulose or asbestos; water-insoluble synthetic polymeric materials; minerals; pigments; glasses; elemental materials including solids, liquids, and gases; flavors; fragrances; reactants; biocidal compositions; physiological compositions; fertilizer compositions; and the like.

Polymeric capsule wall materials eligible for use in the practice of this invention can be negatively charged (anionic), positively charged (cationic) or can have both positive and negative charges (amphoteric). As previously stated, at least one component of the encapsulating system of polymeric materials must be an electrically charged, autogenously polymerizable, polymeric material. Examples of such autogenously polymerizable materials have been mentioned above.

Components of the encapsulating system of polymeric materials to be used in combination with the autogenously polymerizing material to cause emergence of a separated liquid phase of wall material must have an opposite net electrical charge and can be autogenously polymerizable or not. Such materials include, for example: the aforementioned autogenously polymerizable resin materials; gelatin; gum arabic; hydrolyzed poly(ethylene-co-maleic anhydride); hydrolyzed poly(methylvinylether-co-maleic anhydride); carrageenan; zein; poly(ethyleneimine); and the like.

DESCRIPTION OF PREFERRED EMBODIMENTS

Example 1

In this example, capsules were prepared wherein the capsule wall material was a complex of gum arabic and a positively charged, water-soluble urea-formaldehyde polymeric material.

Into a vessel having a capacity of about 1,000 milliliters and equipped for agitation and heating were placed 20 milliliters of 3 percent, by weight, aqueous gum arabic solution and 10 milliliters of 35 percent, by weight, aqueous cationically modified urea-formaldehyde resin solution characterized by having a specific gravity of about 1.14 to 1.15 at 25° Centigrade, a solution pH of about 7.0 to 7.2 and a nitrogen content of about 9.2 percent, by weight (such as the material designated as "Parex Resin 615–B–35" sold by American Cyanamid Company, New York, N.Y., United States of America). The materials were agitated to provide a solution and 20 grams of a 1:1, by weight, mixture of trichlorobiphenyl and a water-insoluble hydrocarbon oil were added to serve as the capsule internal phase for this example. Agitation was adjusted to yield a dispersion of the oily capsule internal phase particles having diameters of about 100 to 200 microns. The pH of the agitating system was adjusted to about 6 and the temperature of the system was adjusted to about 35° Centigrade. Slowly, in a dropwise fashion, 400 milliliters of water was added to the system to cause complex coacervation of a liquid solution of the urea-formaldehyde resin/gum arabic combination of materials. The separated liquid coacervate solution wet and enwrapped the oily capsule internal phase particles to yield liquid-walled capsules and the system was then permitted to stir for about 24 hours to undergo autogenous polymerization of the urea-formaldehyde resin material,—the polymerization being induced by adjustment of the pH below 6 and increase of the temperature above room temperature (about 25 ° Centigrade). The resulting, rigid-walled,capsules were then separated from the manufacturing vehicle, washed with water and dried to yield apparently dry, powderlike, granular, individual capsules which individually released their oily contents when ruptured. The autogenous polymerization to harden the capsule walls of this example could have been hastened by increasing the temperature of the system or by a decrease in pH over that caused by the gum arabic addition.

EXAMPLE 2

The encapsulating procedure for this example was much like that of the preceding example 1 with the exceptions that the temperature of the system was held at about 25° Centigrade and the pH of the system was reduced to about 4.5.

Into a vessel having a capacity of about 600 milliliters and equipped for agitation and heating were placed 50 milliliters of 10 percent by weight, aqueous gum arabic solution and 50 milliliters of 25 percent, by weight, aqueous, cationically modified urea-formaldehyde resin solution characterized by having a specific gravity of about 1.10 to 1.11 at 25° Centigrade, a solution pH of about 7.0 and a nitrogen content of about 6.6 percent, by weight, (such as the material designated as "Parez Resin 615–B–25" sold by American Cyanamid Company, New York, N.Y. York, United States of America). The materials were agitated to provide a solution and 100 milliliters of cyclohexane were added to serve as the capsule internal phase for this example. Slowly, in dropwise fashion, 160 milliliters of water were added to the stirring system to cause phase separation of a liquid solution rich in urea-formaldehyde resin/gum arabic complex. Globules of the separated liquid phase wet and enwrapped particles of cyclohexane to form liquid-walled capsules. Hydrochloric acid was used to lower the pH of the system to about 4.5 and the system, now including a dispersion of liquid-walled capsules, was permitted to agitate overnight to accomplish autogenous polymerization of the urea-formaldehyde resin which was catalyzed by hydrogen ions provided by the hydrochloric acid. The resulting slurry of capsules in manufacturing vehicle was coated onto paper and dried to yield apparently dry, rigid-walled capsules which released cyclohexane liquid when they were ruptured.

EXAMPLE 3

This example utilized, as capsule wall material, a complex of: (a) the cationically modified urea-formaldehyde resin material solution as specified in example 1 and (b) gelatin at a pH above its isoelectric point. The gelatin used was pigskin gelatin of the acid-precursor type having an isoelectric point of about 8 to 9 and a Bloom strength of about 285–305grams.

Into a Waring Blendor cup having a capacity of about 1,000 milliliters were placed 85 milliliters of 10 percent, by weight, aqueous gelatin solution, 30 milliliters of the cationically modified urea-formaldehyde resin solution specified in example 1and 100 milliliters of the oily capsule internal phase specified in example 1 The blender was operated to provide an emulsion of capsule internal phase droplets in a solution of the gelatin and resin. The emulsion was then diluted with water to a volume of nearly 1,000 milliliters and the pH was raised to about 8.0, at which the gelatin complexed with the urea-formaldehyde, to cause coacervation and subsequent capsule wall formation. The capsules were agitated overnight to permit completion of the autogenous polymerization reaction.

EXAMPLE 4

In this example, an anionically modified urea-formaldehyde resin was utilized with the type of gelatin specified in example 3, above. The pH of the system utilized in this example is well below the isoelectric point of the gelatin, thereby causing the gelatin to behave as a cationic polymeric material.

Into a vessel having a capacity of about 1,000 milliliters and equipped for agitation and heating were placed 40 milliliters of 11 percent, by weight, aqueous gelatin solution (the type of gelatin specified in example 3) and 460 milliliters of warm (about 50° Centigrade) water. Into the warm gelatin solution were dispersed 100 milliliters of a hydrocarbon oil (such as the hydrocarbon oil designated as "Cyclosol 38," characterized by having a density of about 0.86 grams per cubic centimeter, a Kauri-Butanol number of about 97 as determined according to the ASTM testing procedure D–1133 and a distillation range of about 134° to 156° Centigrade and sold by the Shell Chemical Company, New York, N.Y., United States of America) and then a solution of 10 grams of anionically modified urea-formaldehyde resin in 200 milliliters of water was added to the agitating system. The anionically modified urea-formaldehyde resin was characterized by having a nitrogen content of about 4.2 percent, by weight, and a pH of about 8 in a 50 percent, by weight, aqueous solution and was designated as "Parez Resin 620" and sold by American Cyanamid Company, New York, N.Y., United States of America. At this point, there was some degree of complex coacervation evident in the vessel, but in order to have a controlling knowledge of the amount of materials required to perform the encapsulation, the pH of the system was raised with aqueous sodium hydroxide solution until the complex coacervate was reversed and had just gone back into solution. Ten percent, by weight, aqueous acetic acid solution was slowly added to the warm stirring system, in a dropwise fashion, to again cause complex coacervation (phase separation) the separated phase wetting and enwrapping the dispersed capsule internal phase particles to the desired observed extent. The temperature of the system was then reduced to about 20° Centigrade to gel the capsule walls. This was further reduced to about 5 to 10° Centigrade to cause a slight shrinkage of the gelled capsule wall material and the system was permitted to agitate overnight in order to allow the autogenous polymerization and consequent capsule wall hardening to be completed. Capsules, still dispersed in the manufacturing vehicle, were coated onto paper sheets and dried. The resulting, apparently dry, rigid-walled capsules released their oily internal phase when ruptured.

EXAMPLE 5

In this example, capsules were prepared wherein the capsule wall material was a complex of poly (vinylmethylether-co-maleic anhydride) and a positively charged, polyamide-epichlorohydrin resin.

The poly (vinylmethylether-co-maleic anhydride) was characterized by having a specific viscosity of 1.0 to 1.4 in 1 percent, by weight, ethylmethylketone solution at a temperature of 25° Centigrade, by having a softening point temperature of 200° to 225° Centigrade and by having a specific gravity of about 1.37 (such as the material designated as "Gantrez AN–903" sold by General Aniline and Film Corp., New York, N.Y., United States of America).

The polyamide-epichlorohydrin resin was sold by Hercules Powder Company, Inc., Wilmington, Del., United States of America as "Kymene 557." The resin was provided in a 10 percent, by weight, aqueous solution having a pH of about 5.0 and a viscosity of A to B+ on the Gardener-Holdt scale as described in test method D–1545- 63 by the American Society for Testing Materials. The dry resin contained about 12.8 percent, by weight, nitrogen. U. S. Pat. No. 2,926,116 issued to Hercules Powder Company on Feb. 23, 1960, on the application of Gerald I. Keim teaches a method for preparing polyamide-epichlorohydrin resins.

Into a vessel having a capacity of about 500 milliliters and equipped for heating and agitation were placed 325 milliliters of water, 25 milliliters of the above-described aqueous polyamide-epichlorohydrin resin solution and 40 milliliters of toluene. Toluene served as capsule internal phase for this example and the contents of the vessel were agitated sufficiently to provide a dispersion of toluene particles having diameters of about 100 microns to about 500 microns. The system was warmed to a temperature of about 40° Centigrade and the pH was adjusted to about 12 using 10 percent, by weight, aqueous sodium hydroxide. FVE milliliters of a warmed, 5 percent, by weight, aqueous solution of the above-mentioned poly (vinylmethylether-co-maleic anhydride) was added to the system. At this point in the encapsulating process, no liquid-liquid phase separation had occurred. The pH of the system was lowered to about 8 to 9 using 14 percent, by weight, aqueous acetic acid solution in order to accomplish liquid-liquid phase separation (coacervation) of the resulting complex of cationic polyamide-epichlorohydrin resin and anionic poly(vinylmethylether-co-maleic anhydride) material. The system was agitated for about 16 hours (overnight) during which time the system was permitted to cool to about 25° Centigrade and also during which time the polyamide-epichlorohydrin resin autogenously polymerized to harden the capsule walls. The agitating system was warmed to a temperature of about 60° to 70° for a duration of about 1 hour to ensure substantial completion of the autogenous polymerization reaction

What is claimed is:

1. In a process for producing minute capsules, en masse, comprising the steps of:
   a. dispersing together an aqueous solution of electrically charged, hydrophilic polymeric film-forming material, minute, substantially water-insoluble, particles of intended capsule core material and hydrophilic, polymeric material having a net electrical charge opposite that of the polymeric film-forming material and
   b. causing a liquid phase of the oppositely charged polymeric materials to emerge by complex coacervation whereby the emergent-separated liquid phase wets and enwraps the dispersed capsule core material
      the improvement which comprises utilizing an autogenously polymerizable polymeric material selected from the group consisting of: sulfomethylated urea-formaldehyde; amine-modified urea-formaldehyde; melamine-formaldehyde salts; polyamide-epichlorohydrin; polyamine-epichlorohydrin; amino-polyacrylamide; polyacrylamide-polyacrylic acid; and ammoniated polyacrylamide-polyacrylic acid as hydrophilic polymeric material and altering conditions in the aqueous solution to cause the autogenously polymerizable polymeric material to further polymerize to produce capsules having hardened, solidified, water-insoluble capsule walls.

2. The process of claim 1 wherein the polymeric film-forming material has a negative net electric charge and the autogenously polymerizable polymeric material has a positive net electric charge.

3. The process of claim 1 wherein the polymeric film-forming material has a positive net electric charge and the autogenously polymerizable polymeric material has a negative net electric charge.

4. In a process for producing minute capsules, en masse, comprising the steps of:
   a. dispersing together an aqueous solution of a first electrically charged, hydrophilic, polymeric material, minute, substantially water-insoluble, particles of intended capsule core material and a second hydrophilic, polymeric, film-forming material having a net electrical charge opposite in polarity to that of the first polymeric material and
   b. causing a liquid phase to emerge from solution by complex coacervation of the polymeric materials whereby the separated liquid phase wets and enwraps the dispersed capsule core material
      the improvement which comprises utilizing an autogenously polymerizable polymeric material selected from the group consisting of: sulfomethylated urea-formaldehyde: amine-modified urea-formaldehyde: melamine-formaldehyde salts; polyamide-epichlorohydrin; polyamine-epichlorohydrin; amino-polyacrylamide; polyacrylamide-polyacrylic acid; and ammoniated polyacrylamide-polyacrylic acid as the first of the hydrophilic polymeric materials and altering conditions in the aqueous solution to cause the autogenously polymerizable polymeric material of the separated liquid phase to further polymerize to produce capsules having hardened, solidified, water-insoluble capsule walls.

5. The process of claim 4 wherein the polymeric film-forming material has a negative net electric charge and the autogenously polymerizable polymeric material has a positive net electric charge.

6. The process of claim 4 wherein the polymeric film-forming material has a positive net electric charge and the autogenously polymerizable polymeric material has a negative net electric charge.

7. In a process for producing minute capsules, en masse, comprising the steps of:
   a. establishing an agitated, aqueous, two-phase liquid system having a discontinuous liquid phase of globules rich in concentration of a complex of an electrically charged, hydrophilic, polymeric, film-forming material and a hydrophilic, polymeric, film-forming material and a hydrophilic, polymeric, material having a net electrical charge opposite in polarity to that of the polymeric film-forming material and a continuous liquid phase of aqueous liquid dilute in concentration of the polymeric materials;
   b. dispersing, in the agitated system, minute, substantially water-insoluble, particles of intended capsule core material which is wet and enwrapped by the globules of step (a) to form liquid-walled capsules
      the improvement which comprises utilizing an autogenously polymerizable polymeric material selected from the group consisting of: sulfomethylated urea-formaldehyde; amine-modified urea-formaldehyde; melamine-formaldehyde salts; polyamide-epichlorohydrin; polyamine-epichlorohydrin; amino-polyacrylamide; polyacrylamide-polyacrylic acid; and ammoniated polyacrylamide-polyacrylic acid as at least one of the hydrophilic polymeric materials of the system and altering conditions in the liquid system to cause the autogenously polymerizable polymeric material to further polymerize to produce capsules having hardened, solidified, water-insoluble capsule walls.

8. The process of claim 7 wherein the polymeric film-forming material has a negative net electric charge and the autogenously polymerizable polymeric material has a positive net electric charge.

9. The process of claim 7 wherein the polymeric film-forming material has a positive net electric charge and the autogenously polymerizable polymeric material has a negative net electric charge.

UNITED STATES PATENT OFFICE
CERTIFICATE OF CORRECTION

Patent No. 3,607,775  Dated September 21, 1971

Inventor(s) NOBLE YOSHIDA and ROBERT E. MILLER

It is certified that error appears in the above-identified patent and that said Letters Patent are hereby corrected as shown below:

Claim 7, line 7: repeating words "and a hydrophilic, polymeric, film-forming material" should be deleted.

Signed and sealed this 22nd day of February 1972.

(SEAL)
Attest:

EDWARD M. FLETCHER, JR.
Attesting Officer

ROBERT GOTTSCHALK
Commissioner of Patents